United States Patent

Sugiyama et al.

Patent Number: 5,848,846
Date of Patent: Dec. 15, 1998

[54] SHELL TYPE NEEDLE ROLLER BEARING AND METHOD OF PRODUCING THE SAME

[75] Inventors: Akira Sugiyama, Hamamatsu; Yukihiro Yamada, Toyodo-cho, both of Japan

[73] Assignee: NTN Corporation, Osaka, Japan

[21] Appl. No.: 900,176

[22] Filed: Jul. 25, 1997

[30] Foreign Application Priority Data

Jul. 26, 1996 [JP] Japan ................................ 8-198194
Feb. 20, 1997 [JP] Japan ................................ 9-36661

[51] Int. Cl.$^6$ ............................................. F16C 33/64
[52] U.S. Cl. ................. 384/625; 29/898.061; 29/898.13; 384/559; 384/565
[58] Field of Search ................................ 384/492, 625, 384/565, 564, 569, 559; 29/898.061, 898.2, 898.13

[56] References Cited

U.S. PATENT DOCUMENTS 2,383,727  8/1945  Lewis ................................. 384/559
5,338,377  8/1994  Mitamura et al. ................. 384/912 X
5,397,188  3/1995  Yoshizuka et al. ................. 384/492

*Primary Examiner*—Thomas R. Hannon
*Attorney, Agent, or Firm*—Fish & Richardson P.C.

[57] ABSTRACT

A method of producing a shell type needle roller bearing having a shell type outer ring whose opposite ends in the axial direction thereof are bent radially inwardly to form flanges; and a plurality of needle rollers arranged along an inner circumferential area of the outer ring. The method comprises the steps of: a) bending one end of the outer ring radially inwardly to form a flange portion on one end of the outer ring for forming the outer ring in the specified shape; b) assembling hardened/tempered needle rollers or un-hardened needle rollers into the outer ring; c) bending other end of the outer ring radially inwardly to form another flange to form a final shape of the needle roller bearing; d) performing a carbonitriding treatment to the assembled needle roller bearing; and then e) performing hardening and tempering treatments to the assembled needle roller bearing.

9 Claims, 4 Drawing Sheets

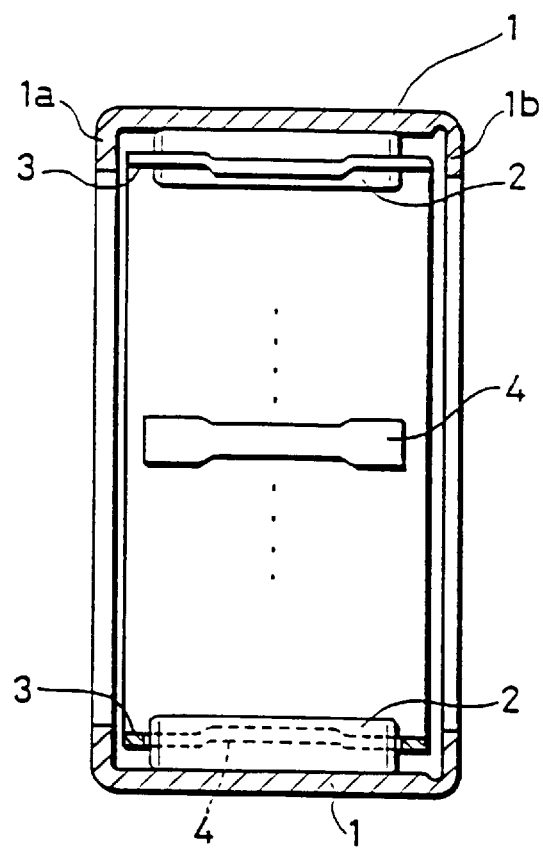

(CONVENTIONAL METHOD)

SHELL TYPE NEEDLE ROLLER BEARING AND METHOD OF PRODUCING THE SAME

BACKGROUND OF THE INVENTION

1. Field of the Invention

This invention relates to a shell type needle roller bearing. In more particular the invention relates to the shell type needle roller bearing whose useful life is prolonged by adding strength to the each parts of the bearing and method of manufacturing the same with simplified steps.

2. Description of the Related Art

First of all, FIG. 1 is a schematic cross sectional diagram showing a general configuration of a shell type needle roller bearing. In the figure, numeral 1 denotes a shell type outer ring (also simply referred to as an outer ring) and the opposite ends in an axial direction of the outer ring 1 were radially inwardly bent to form flanges 1a, 1b. Inner portion of the outer ring, disposed are a plurality of needle rollers 2 along the circumferential direction of the outer ring 1. Furthermore, a retainer 3 formed in a tubular shape is placed in the outer ring 1. The retainer 3 has a plurality of axially extended openings 4 around the circumferential direction thereof at equi-distance to lay the plurality of needle rollers in a manner that the plurality of needle rollers are rotatable in relation to the respective openings.

Though the needle rollers 2 shown in FIG. 1. are supported with an aid of the retainer 3, there is also generally known of the type of the needle roller bearing in which the needle rollers 2 are supported by the flanges on opposite sides of the outer ring that were further bent inwardly into the axial direction of the outer ring.

The thus constructed shell type needle roller bearing enables to bear high load and impact load applied thereto by a line contact of the each needle rollers. Thus this type of roller bearing has been used for a transmission and an anti-lock braking system pump and the like.

Next the conventional method of producing the shell type needle roller bearing is described with reference to FIGS. 2A to 2C. First of all, as shown in FIG. 2A, one axial end of the outer ring (simply one end 1a) is to be bent radially inwardly while keeping the other end (simply other end 1b) straight in the axial direction and then heat treatments (hardening/tempering) are performed to the outer ring in its entirety to gain desired hardness. Thereafter, the other end 1b is to be annealed to soften the end so that the end can be bent in the latter stage.

Then in the step shown in FIG. 2B, a sub-assy (assembly) is formed in such a way that the plurality of needle rollers 2 are placed into the respective openings 4 formed around the circumferential direction of the retainer 3. Then thus formed sub-assy is to be placed into the outer ring 1 till the leading end of the retainer comes closer to the flange portion 1a of the outer ring 1. Then at the end, the other end 1b of the outer ring 1 is to be bent radially inwardly to make a final shape of the shell type needle roller bearing as show in FIG. 2C.

In the above procedures, prior to an assembling procedure, standard heat treatments including hardening and tempering processes were performed to the needle rollers 2, thus the rollers have already gained desired strength when being assembled to the outer ring. As a material for the needle rollers 2 for instance, a SUS bearing steel (JIS: G4805 SUJ) is generally used as one of the kinds of high-carbon high-chromium steel so that at the end retained austenite is formed on the surface of the rollers with a certain depth in a manner that the retained austenite concentrates as close to the surface of the roller and the maximum amount of the retained austenite in its volume ratio is 15% in ordinary case. Accordingly, the surface hardness number of the needle roller 2 for Vickers test is in a range of 700–750 (Hv).

On the other hand, for the material of shell type outer ring 1, a case hardening (carburizing) steel such as SM 415 is used and for the retainer 3, a cold rolling steel such as SPCC is generally used and it is subjected to nitriding process for softening the material.

In the thus described conventional method, however, the shell type outer ring 1, the needle rollers 2 and the retainer 3, all those parts each individually, had been subjected to the heat treatment process prior to an assembling step. As a result, the number of steps required for assembling to the final stage is greater than desired, thus it has been felt necessary to reduce the number of steps to the final stage of production by simplifying the steps.

In addition to the reduction of the total number of steps required for producing the needle roller bearing having satisfied strength, there exists another room for the improvement. That is to do with the unbalanced hardness at the one end and the other end of the outer ring, resulting in destroying the uniformity in strength of the bearing. That in turn necessitates a cumbersome consideration before placing the needle roller bearing into such as a bearing housing as to which side end of the outer ring should come into the inner most of the bearing housing or so forth. Moreover, above described method unnecessarily adds up the history of heat treatment for the outer ring in particular that may adversely affect the precision of the dimension and configuration of the bearing. For instance outer diameters at the one end, at the middle point, at the other end of the outer ring may not coincide among each other; instead those values vary at the respective positions and the roundness of the outer ring at the respective positions is likely to be out of the acceptable range due to the adverse effect resulting from the heat treatment.

In addition, the needle roller bearing produced according to the conventional method has a following drawback. Specifically, the other end 1b of the outer ring 1 is annealed at the step shown in FIG. 2C, the hardness of the outer ring 1 in part declines and a dispersion of the hardness over the outer shell in the axial direction would likely result. And the shell type needle roller bearing of this type is likely be in use in the atmosphere where hard foreign objects likely get in, thus the needle roller bearing made by the conventional method may not be sufficient in strength level, i.e., the useful life of the such needle roller bearing when used in the atmosphere gets shortened. In view of this situation, it has been desired to further prolong the useful life of the needle roller bearing of this type when used in such severe atmosphere.

This invention has been made to overcome the foregoing drawbacks, and thus the invention has an object to provide a shell type needle roller bearing, having a higher strength than the conventional ones, that can sustain the longer life when used in the atmosphere where foreign objects likely get into the interior of the bearing and at the same time keep the roundness (circularity) of the outer ring in the desired level.

The second object of this invention is to provide a rather simple method of producing the above described needle roller bearing.

SUMMARY OF THE INVENTION

The first object is fulfilled according to this invention directed to the shell type needle roller bearing that comprises a shell type outer ring having radially inwardly bent flange portions on opposite ends thereof; and a plurality of needle rollers disposed radially inwardly of the outer ring, each needle roller forming a nitrogen rich layer portion on its surface, the nitrogen rich layer containing a retained austenite of 20 vol. % or more than 20 vol. %.

The second object is fulfilled according to this invention directed to the method of producing a shell type needle roller bearing that comprises the steps of:

a) bending one end of the outer ring radially inwardly to form a flange portion on one end of the outer ring for forming the outer ring in a specified shape;

b) assembling either one of hardened/tempered needle rollers or unhardened needle rollers into the outer ring;

c) bending other end of the outer ring radially inwardly to form another flange to form a final shape of the needle roller bearing;

d) performing a carbonitriding treatment to the assembled needle roller bearing; and then e) performing hardening and tempering treatments to the assembled needle roller bearing.

The above and other objects, features and advantages of the present invention will become more apparent upon reading of the following detailed description and drawings.

BRIEF DESCRIPTION OF THE DRAWINGS

FIG. 1 is a schematic cross sectional drawing showing a general configuration of a shell type needle roller bearing;

DETAILED DESCRIPTION OF THE PREFERRED EMBODIMENT

In order to achieve the above objects, various examinations in different view points were conducted by the inventors. As a result, the above described methods if applied to produce a shell type needle roller bearing will eliminate a heat treatment step previously required for each elements of the conventional needle roller bearing before being assembled into the shell type outer ring. That, in turn, simplifies the heat treatment steps needed to make the needle roller bearing as a whole. In addition to the achievement of the simplified heat treatment steps required for the needle roller bearing in total, with the method of this invention, a life of the shell type needle bearing is prolonged while keeping the superior roundness thereof.

The method of producing the shell type needle roller bearing is now explained in details with reference to the above mentioned FIGS. 1 & 2 as in the following passages.

Figure 2A:
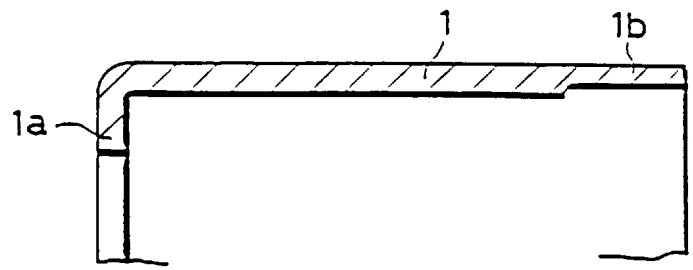
FIGS. 2A–2C are schematic illustrations showing the steps of conventional method of assembling the shell type needle roller bearing.

First of all, one side end of an outer ring 1 is bent radially inwardly to form a flange 1a and then the outer ring with the flange 1a is formed into the specified dimensions in the configuration shown in FIG. 2A without going through any heat treatments. In other words, the outer ring 1 in the form of FIG. 2A has not gone through the heat treatment.

Figure 2B:
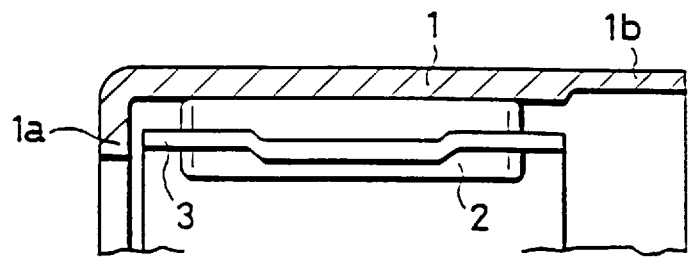
Figure 2C:
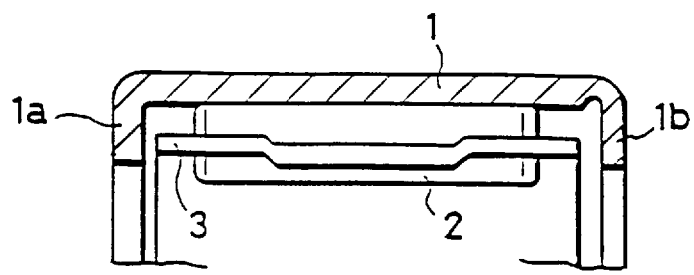
Figure 3:
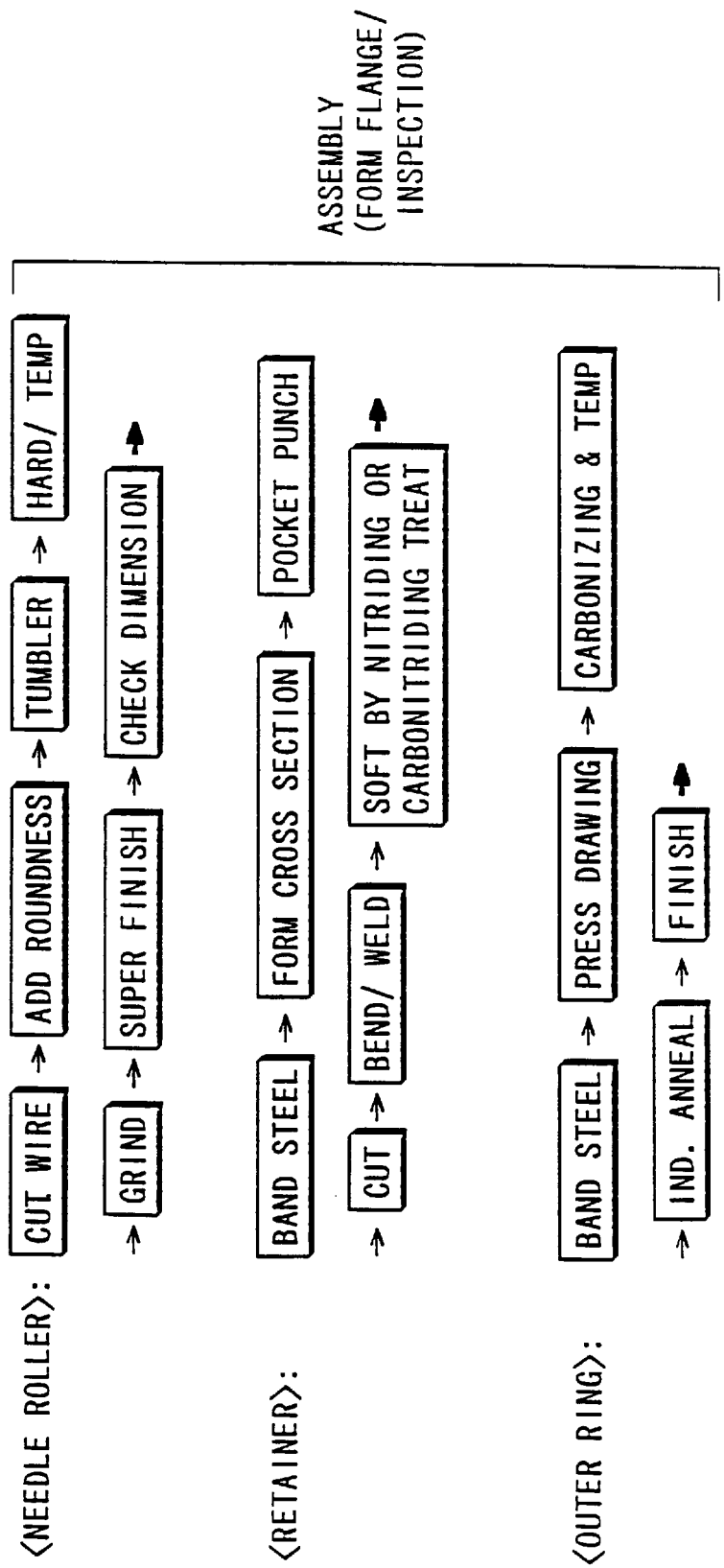
FIG. 3 is a block diagram showing conventional manufacturing steps of the shell type needle roller bearing.
Figure 4:
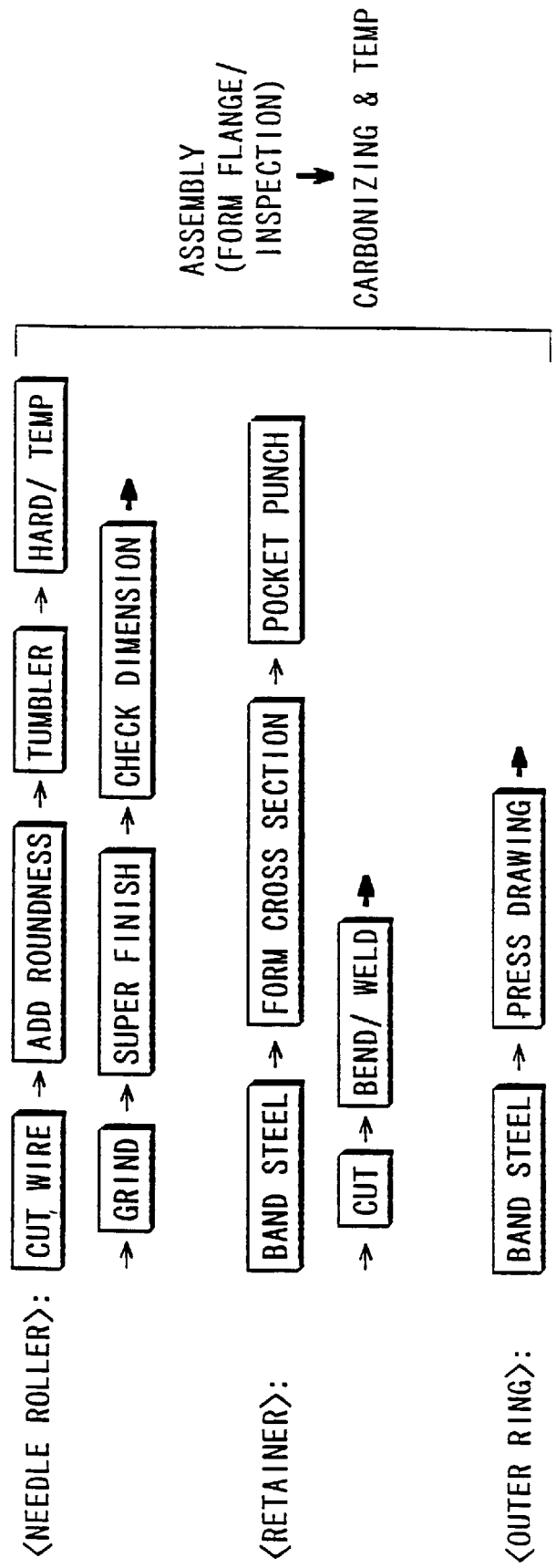
FIG. 4 is a block diagram showing manufacturing steps of the shell type needle roller bearing of this invention.

Second, a plurality of needle rollers 2 that had either undergone heat treatments such as hardening and tempering or had not undergone the heat treatments are placed in the respective openings 4 (see FIG. 1) formed in a retainer 3 and then the sub assembly consisting of the retainer 3 and the needle rollers 2 positioned at respective places around the retainer 3 is inserted to the shell type outer ring 1 from its other end 1b thereof to form the posture as shown in FIG. 2B. Then the other end 1b of the shell type outer ring 1 is bent radially inwardly to form a closing flange 1b to complete a physical assemblage of the needle roller bearing as shown in FIG. 2C. After the completion of the parts assembly of the needle roller bearing, the needle roller bearing assembly is subject to heat treatments; starting from the carbonitriding, hardening, to tempering in sequential order to finalize the shell type needle roller bearing as a product on sale.

As described in the above passage, a basic idea of this invention is that at a production stage when the one end flange 1a was formed, the outer ring 1, the needle rollers 2, and the retainer 3 all were essentially not subjected to the hardening and tempering treatments and then all those without undergoing heat treatment processes are assembled to make a final configuration of the shell type needle roller bearing, thereafter the assembled parts all are to be subject to the sequential heat treatments; carbonitriding, hardening and tempering in the described order.

The above methods took a shell type needle roller bearing with a retainer 3 as an example to describe the method of production, this invention, however, is applicable to those shell type needle roller bearings without a retainer 3 in that rollers stay inwardly of the outer ring. The needle rollers in this type of bearing are securely held at the respective positions around the inside of the outer ring by means other than the retainer; the holding means of the needle rollers with respect to the outer ring is not described in here but is assumed to be within the knowledge of those who are skilled in the art. Thus for those types of needle roller bearings without retainer certainly benefit from this invention with only the fact that the retainer was not assembled into the bearing.

By following the foregoing production steps, the parts of the needle roller bearing; a shell type outer ring, needle rollers (a retainer in case of the bearing type earlier described) are all subjected to the heat treatment at the same time to gain the required strength, thus eliminated is the each heat treatment previously conducted to the each element of the conventional needle roller bearing, thereby rendering to simplify the heat treatment steps required to the needle roller bearing as a whole. Moreover the annealing treatment was required for a portion of the outer ring of the conventional bearing when bending the hardened end 1b of the outer ring to form a closing flange for preventing all the elements assembled therein to fall. This was necessary because the end to be bent after putting all the elements into the shell type outer ring was hardened already by hardening heat treatment. Accordingly this provision of avoiding annealing step to the portion of the outer ring will provide a superior result regarding the uniformity of the hardness throughout the outer ring. As a result, it will certainly eliminate a necessity in consideration of the insertion direction of the needle roller bearing into the respective positions as the hardness of the needle roller bearing is much more uniform and that does not alter on the basis of the directionality of the needle roller bearing.

In the view point of simplification of production steps, it is considered to be better for the needle rollers not to subject to the heat treatment when assembled to the shell type outer ring. However, from the another point of view, conducting hardening treatment onto the needle rollers before assembly is not necessarily disagreeable when taking into consideration the positive effect that this would add more strength when the assembly undergoing the carbonitriding treatment despite the increase of one step in heat treatment. In fact, adding this one step in the production steps, it still is considered to be much simpler production steps as a whole as compared to the conventional production steps of the needle roller bearing.

EXAMPLE

Hereinafter this invention is described in more details with reference to the specific example. However, the following examples should no way affect this invention in such a manner to limit the scope of this invention. Thus it should be understood that altering the design parameters based on the following explanations is within the scope of this invention.

The shell type needle roller bearings are produced according to the method of this invention and the method in the conventional technology as in the following:

(A) The method of this invention

Each elements of the needle ball bearing is made according to the following conditions.

<Needle roller>

Cut wire rod (SUJ2 Steel)→Add roundness to the edged portions→Tumbler→Hardening & Tempering (*1)→Grinding outer surface→Super finish outer surface→inspect dimensions

*1: Oil quenching at 840° C. for 30 min. then tempering at 180° C. for 90 min.

<Retainer>

Band Steel (SPC)→Form cross sectional shape→Pocket punch→Cut→Bend & Welding

<Shell type outer ring>

Band Steel (SCM 415)→Deep drawing (Bending only one end side)

The needle roller and the retainer are to be assembled into the outer ring produced according to the above method, then the other end of the outer ring is to be bent radially inwardly to form a final shape. The thus assembled bearing is to undergo the carbonitriding treatment (see below for the treatment in more details), hardening and tempering treatments in sequential order to produce the shell type needle roller bearing of this invention.

(condition for the carbonitriding treatment)

Carbonitriding the outer ring in the atmosphere in which 1–3 vol. % of Ammonia is added to RX gas at 840°–850° C. for 35 minutes then rapidly oil quench the outer ring.

(B) Conventional method

The needle roller and the retainer are assembled into the shell type outer ring made according to the following conditions. Thereafter, the other end of the outer ring having been annealed is bent radially inwardly to finalize the shape of the needle roller bearing.

<Needle roller>

Cut wire rod (SUJ2 Steel)→Add roundness to the edged portions→Tumbler→Hardening & Tempering (*2)→Grinding outer surface→Super finish outer surface→inspect dimensions

*2: Oil quenching at 840° C. for 30 min. then tempering at 180° C. for 90 min.

<Retainer>

Band Steel(SPC)→Form cross sectional shape→Pocket punch→Cut→Bend & Welding

<Outer ring>

Band Steel (SCM 415)→Press drawing→carburizing & tempering→induction annealing→Finish process The conditions for heat treatment of the conventional method is as follows:

(1) Retainer: Soft nitriding treatment at 570°–580° C. for 35 min.;

(2) Needle roller: Austenitizing at 840° C. for 90 minutes, then oil quenching thereafter tempering at 180° C. for 90 min.

(3) Shell type outer ring: Carburizing at 840°–890° C. for 60 min. (in RX gas filled atmosphere), then oil quenching, and thereafter tempering at 165° C. for 60 min. (One side of the ring is annealed by induction heating)

Table 1 below shows characteristics (in terms of roundness, life $L_{10}$ and other parameters) of the needle roller bearings made according to the method of this invention and the conventional method in comparison form. Note that the bearing specimens (an open end type) used for this test as the invented one and conventional one both are of 15 mm in inner dia.; 23 mm in outer dia.; and 16 mm in width. The evaluation criteria for the roundness and life of the bearing are as described in the following passage.

(Roundness measurement)

Outer surface of the outer ring at the side edge portion which was bent radially inwardly at last is measured of its roundness. More specifically, a surface of the outer ring at 12.7 mm in an axial direction from the one end of the ring which was bent first by press process is to be measured for its roundness with a talyrond (produced by Taylor Hobson Ltd.). Then the measured data is converted to the ratio by dividing the same by the measurement data of the conventional bearing, i.e., equating the data of the conventional bearing to 1.0.

(Life$_{10}$)

A fatigue life test is performed at a rotational speed of 5000 rpm under the application of a radial load of 572 kgf to both bearings (invented one and conventional one).

TABLE 1

| Items | Bearing of this invention | Conventional bearing for comparison |
|---|---|---|
| Needle Roller | | |
| Amount of retained austenite (vol. %) | Surface: ≧20% (20–30%) Inside: 13–17% | Surface: 11–13 % Inside: 11–13 % |
| Nitrodized Layer thickness | ≧0.1 mm | none |
| Surface Hardness (Hv) | 750–800 | 700–800 |
| Inner Hardness (Hv) | 750–800 | 700–800 |
| Shell type Outer Ring | | |
| Amount of retained austenite (vol. %) | Surface: ≧25% (25–35%) | Surface: 15–20% |
| Nitrodized Layer thickness | ≧0.05 mm | none |
| Hardness of Press formed flange portion | 750–800 | 750–800 |

TABLE 1-continued

| Items | Bearing of this invention | Conventional bearing for comparison |
|---|---|---|
| (Hv) Hardness of Bent flange portion (Hv) Retainer | 750–800 | 500–550 |
| Surface Hardness (Hv) | 750–800 | 350–550 |
| Inner Hardness (Hv) | 150–170 | 150–170 |
| Roundness of the outer ring (Ratio) | ½ | 1 |
| Fatigue life $L_{10}$ (Hours) | 142 | 70 |

An observation is made from the results in the above table that the bearing of this invention earns more strength and longer life compared to the bearing of conventional type. In addition, with the bearing made according to this invention the number of the process required for the production can be fewer than the bearing of the conventional type as the heat treatment for each elements can be omitted, thereby enabling the simplified manufacturing process.

Although the present invention has been fully described by way of example with reference to the accompanying drawings, it is to be understood that various changes and modifications will be apparent to those skilled in the art without departing from the spirit and scope of the present invention. Accordingly the invention should not be limited to the foregoing description but rather should be only by the following claims.

What is claimed is:

1. A shell type needle roller bearing comprising:

an outer ring having radially inwardly bent flange portions on opposite ends thereof;

a plurality of needle rollers disposed radially inwardly of the outer ring, each needle roller forming a nitrogen rich layer portion on its surface, the nitrogen rich layer containing a retained austenite of 20 vol. % or more than 20 vol. %.

2. A shell type needle roller bearing according to claim 1, wherein a thickness of the nitrogen rich layer is 0.1 mm or more than 0.1 mm.

3. A shell type needle roller bearing according to claim 1, wherein a surface hardness of the needle roller is 750 in Hv or higher than 750 in Hv.

4. A shell type needle roller bearing according to claim 1, wherein the outer ring forms a nitrogen rich layer on a circumferential surface thereof and the nitrogen rich layer contains a retained austenite of 25 vol. % or more than 25 vol. %.

5. A shell type needle roller bearing according to claim 1, wherein a thickness of the nitrogen rich layer is 0.05 mm or more than 0.05 mm.

6. A shell type needle roller bearing according to claim 1, wherein the hardness of the one side edge and the other side edge of the outer ring are substantially the same.

7. A shell type needle roller bearing according to claim 1, further comprising a retainer rotatably holding the plurality of needle rollers, and a nitrogen rich layer is formed on the entire surface of the retainer and the surface hardness of thereof is 750 (Hv) or higher than 750 (Hv).

8. A method of producing a shell type needle roller bearing comprising the steps of:

a) bending one end of the outer ring radially inwardly to form a flange portion on one end of the outer ring for forming the outer ring in a specified shape;

b) assembling either one of hardened/tempered needle rollers or un-hardened needle rollers into the outer ring;

c) bending other end of the outer ring radially inwardly to form another flange to form a final shape of the needle roller bearing;

d) performing a carbonitriding treatment to the assembled needle roller bearing; and then e) performing hardening and tempering treatments to the assembled needle roller bearing.

9. A method of producing a shell type needle roller bearing according to claim 8, wherein the shell type needle roller bearing further includes an un-hardened retainer that is assembled into the outer ring in the above step (b).

* * * * *